US008527186B2

(12) United States Patent
Wong et al.

(10) Patent No.: US 8,527,186 B2
(45) Date of Patent: Sep. 3, 2013

(54) METHOD AND APPARATUS FOR ADAPTIVE FEEDBACK CONTROL OF AN EXCESS AIR RATIO IN A COMPRESSION IGNITION NATURAL GAS ENGINE

(75) Inventors: Hoi Ching Wong, San Diego, CA (US); Madhusudhan Chellappa, San Diego, CA (US); Carlos Gamez, Ocala, FL (US)

(73) Assignee: Clean Air Power, Inc., Poway, CA (US)

( * ) Notice: Subject to any disclaimer, the term of this patent is extended or adjusted under 35 U.S.C. 154(b) by 321 days.

(21) Appl. No.: 12/877,487

(22) Filed: Sep. 8, 2010

(65) Prior Publication Data

US 2012/0055457 A1    Mar. 8, 2012

(51) Int. Cl.
*F02D 41/14*    (2006.01)
*G06F 19/00*    (2011.01)

(52) U.S. Cl.
USPC ........... 701/109; 123/674; 123/695; 701/103; 701/106

(58) Field of Classification Search
USPC ................. 123/672, 674, 703, 673, 690, 691, 123/692, 698, 699, 431, 575, 443, 525, 527; 701/103, 109, 107; 73/114.69, 114.72, 114.73, 73/114.71; 60/276, 285, 286
See application file for complete search history.

(56) References Cited

U.S. PATENT DOCUMENTS

| | | | |
|---|---|---|---|
| 5,158,062 A * | 10/1992 | Chen | 123/674 |
| 5,287,283 A | 2/1994 | Musa | |
| 5,450,829 A | 9/1995 | Beck | |
| 5,553,575 A | 9/1996 | Beck et al. | |
| 5,615,550 A | 4/1997 | Ogawa et al. | |
| 5,911,682 A | 6/1999 | Kato et al. | |
| 5,947,097 A | 9/1999 | Harada | |
| 6,431,160 B1 | 8/2002 | Sugiyama et al. | |
| 6,701,905 B1 | 3/2004 | Gaskins | |
| 6,932,069 B2 | 8/2005 | Suyama et al. | |
| 6,941,936 B2 | 9/2005 | Yasui et al. | |
| 7,044,118 B2 | 5/2006 | Tonetti et al. | |
| 7,137,386 B1 | 11/2006 | Ruiz | |
| 7,150,266 B2 * | 12/2006 | Nakayama et al. | 123/431 |
| 7,152,594 B2 | 12/2006 | Anilovich et al. | |
| 7,155,332 B2 | 12/2006 | Yamada et al. | |
| 7,159,389 B2 * | 1/2007 | Miura | 60/295 |
| 7,270,119 B2 | 9/2007 | Mitsutani | |
| 7,440,839 B2 * | 10/2008 | Cesario et al. | 701/106 |
| 2003/0187565 A1 | 10/2003 | Wong | |
| 2007/0000456 A1 | 1/2007 | Wong | |
| 2008/0147303 A1 * | 6/2008 | Ito et al. | 701/111 |

FOREIGN PATENT DOCUMENTS

EP    1 234 966 A2    8/2002
WO    2007/115594 A1    10/2007

* cited by examiner

*Primary Examiner* — Stephen K Cronin
*Assistant Examiner* — Carl Staubach
(74) *Attorney, Agent, or Firm* — Boyle Fredrickson, S.C.

(57) ABSTRACT

A computer-implemented method is used to correct deviations between a predicted gas excess air ratio and a calculated excess air ratio in a dual fuel engine or other gas fueled compression ignition engine. The method includes determining gas excess air ratio for the engine based at least in part on at least one detected current operating parameter and calculating a predicted exhaust gas oxygen concentration engine based on the predicted gas excess air ratio. A time based filtered predicted exhaust gas oxygen concentration value may then be calculated and compared to a time-based filtered measured exhaust gas oxygen concentration value. The resultant oxygen concentration deviation value may be used to generate a corrected predicted gas excess air ratio.

19 Claims, 8 Drawing Sheets

Region of Interest on Exhaust Oxygen Mole Fraction

METHOD AND APPARATUS FOR ADAPTIVE FEEDBACK CONTROL OF AN EXCESS AIR RATIO IN A COMPRESSION IGNITION NATURAL GAS ENGINE

BACKGROUND OF THE INVENTION

1. Field of the Invention

This invention relates generally to compression ignition engines, and, more particularly, relates to a method and apparatus for controlling a gas excess air ratio in a compression ignition natural gas engine.

2. Discussion of the Related Art

Recent years have seen an increased demand for the use of gaseous fuels as fuel source in internal combustion engines. Gaseous fuels such as propane or natural gas are considered by many to be superior to diesel fuel and the like as a dual source for compression ignition engines because gaseous fuels are generally less expensive, provide equal or greater power with equal or better mileage, and produce significantly lower emissions. This last benefit renders gaseous fuels particularly attractive because recently enacted and pending worldwide regulations may tend to prohibit the use of diesel fuel in many engines. In addition, adapting an engine to be fueled at least in part by gaseous fuels can significantly reduce an engine's carbon footprint, particularly if the gaseous fuel is obtained from biomass or another carbon-neutral source. The attractiveness of gaseous fuels is further enhanced by the fact that existing compression ignition engine designs can be readily adapted to burn gaseous fuels.

When used to fuel compression ignition engines, the relatively compressible gaseous fuel typically is ignited through the autoignition of a "pilot charge" of a relatively incompressible fuel, such as diesel fuel, that is better capable of compression ignition.

Lean burn engines, including standard diesel engines and dual fuel engines, have a wide range of desired lambdas as compared to a gasoline engine which generally operates in a small band around the stoichiometric (lambda=1). To improve performance, some lean burn engines have relied on open loop lambda control using empirical data obtained during system development. Such systems control fuel and/or air supply (such as through exhaust gas recirculation (EGR) or turbo wastegate control) to achieve or maintain an experimentally determined ideal lambda for prevailing speed and load conditions.

However, gaseous fuels have a relatively narrow range of useful excess air ratios or lambdas (defined as the ratio of total air available for combustion to that required to burn all of the fuel). In any fuel, if lambda drops below a minimum threshold, $NO_x$ and other emissions increase to unacceptable levels. On the other hand, if lambda rises above a maximum acceptable threshold, misfiring can occur, resulting in excessive unwanted emissions and sharply decreased thermal efficiency.

It is therefore essential for optimum control of combustion in gas fueled engines to maintain lambda values within a permissible range, and preferably to cause lambda values to approach optimum levels. This control is hindered by the fact that engine performance and exhaust emissions may change over time and/or may not correlate precisely with pre-calibrated characteristics when the engine is operated in the field under varying operating conditions. As a result, given air and fuel supplies and a given EGR ratio may not achieve a pre-determined lambda at prevailing engine operation conditions.

This problem could be alleviated through closed loop lambda control using EGO (EGO) concentration as a feedback, it being recognized that EGO concentration correlates directly to lambda. However, closed loop lambda control based on desired EGO concentration is complicated by a variety of factors. The desired EGO concentration can change significantly depending on prevailing operating conditions, fuel quality, and other factors affecting fuel and air supply. Lambda variations and variations in combustion efficiency also hinder the determination of a desired EGO concentration. In addition, even if the desired EGO content can be precisely calculated, the lag between the generation of the fuel demand signal and the resultant EGO concentration determination hinders real-time feedback of lambda control using EGO concentration measurements.

The need therefore has arisen to provide lambda control in gaseous fueled compression ignition engines using a closed loop feedback in view of the variations in operating conditions and fuel quality, and in view of limitations imposed by feedback loop timing.

SUMMARY OF THE INVENTION

In accordance with a preferred aspect of the invention, a computer-implemented method is implemented for correcting deviations between a predicted gas excess air ratio and the actual gas excess air ratio in a compression ignited natural gas engine. The method includes calculating or predicting a gas excess air ratio for the engine based on at least one detected current operating parameter and calculating a predicted exhaust gas oxygen (EGO) concentration based on the determined gas excess air ratio. A time-based filtered value dependent on this value is compared to a time-based filtered measured EGO concentration value. The resultant EGO concentration deviation value may be used to generate a corrected gas excess air ratio for open loop control. Both predicted and measured gas excess air ratios may be corrected In accordance with another aspect of the invention, the time based filtering may compensate for the lag between the time that fuel is demanded for a given combustion cycle and the time that the resultant EGO concentration for that cycle is measured.

In accordance with yet another aspect of the invention, the method further include calculating at least a lean corrected gas excess air ratio limit, a desired corrected gas excess air ratio, and a rich corrected gas excess air ratio limit.

In accordance with another aspect the invention, a gaseous fueled compression ignition engine is provided having a control system providing adaptive feedback control of excess air ratio using a technique generally as described above.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENTS

Figure 1:
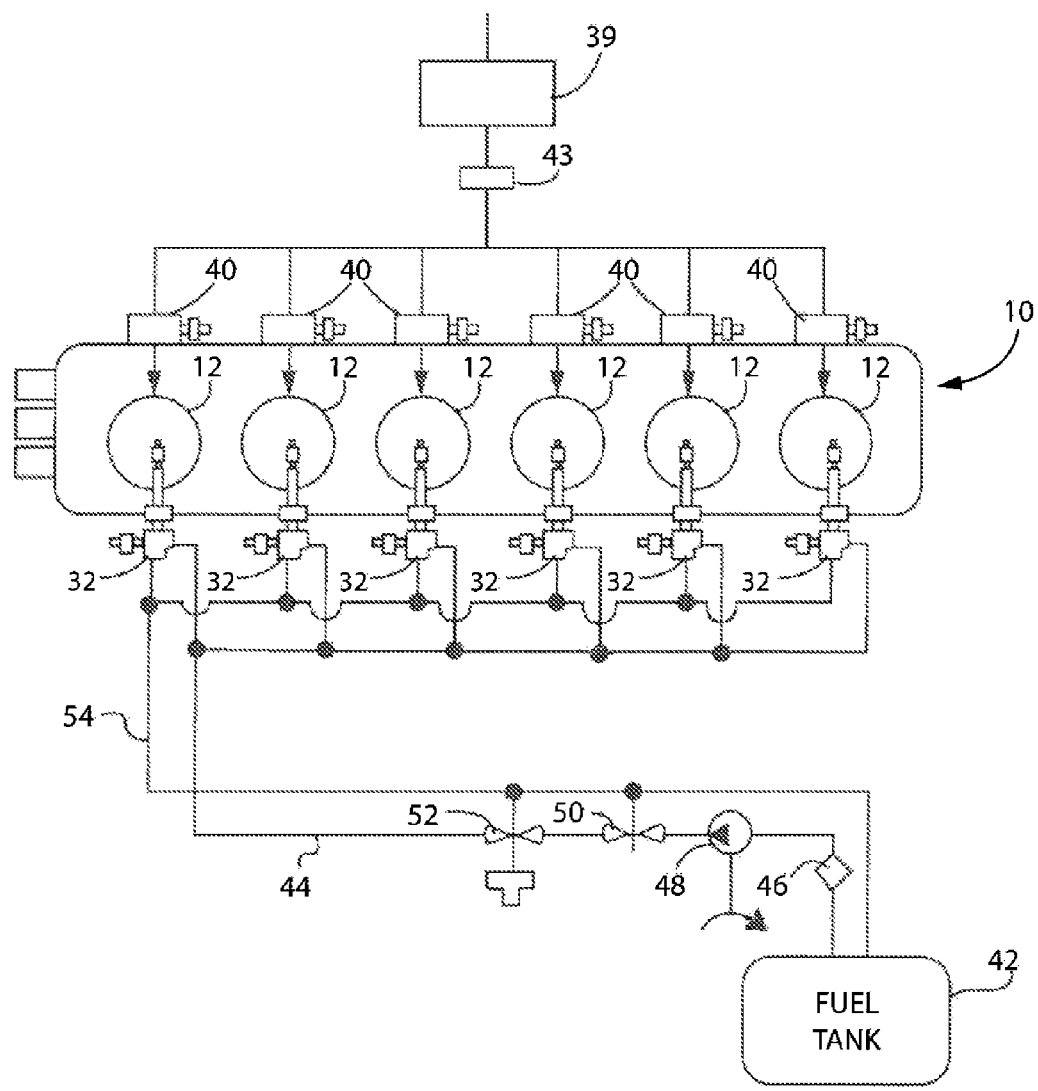
FIG. 1 is a schematic view of a gaseous fueled compression ignition engine constructed in accordance with a preferred embodiment of the invention and of fuel supply systems for the engine.
Figure 2:
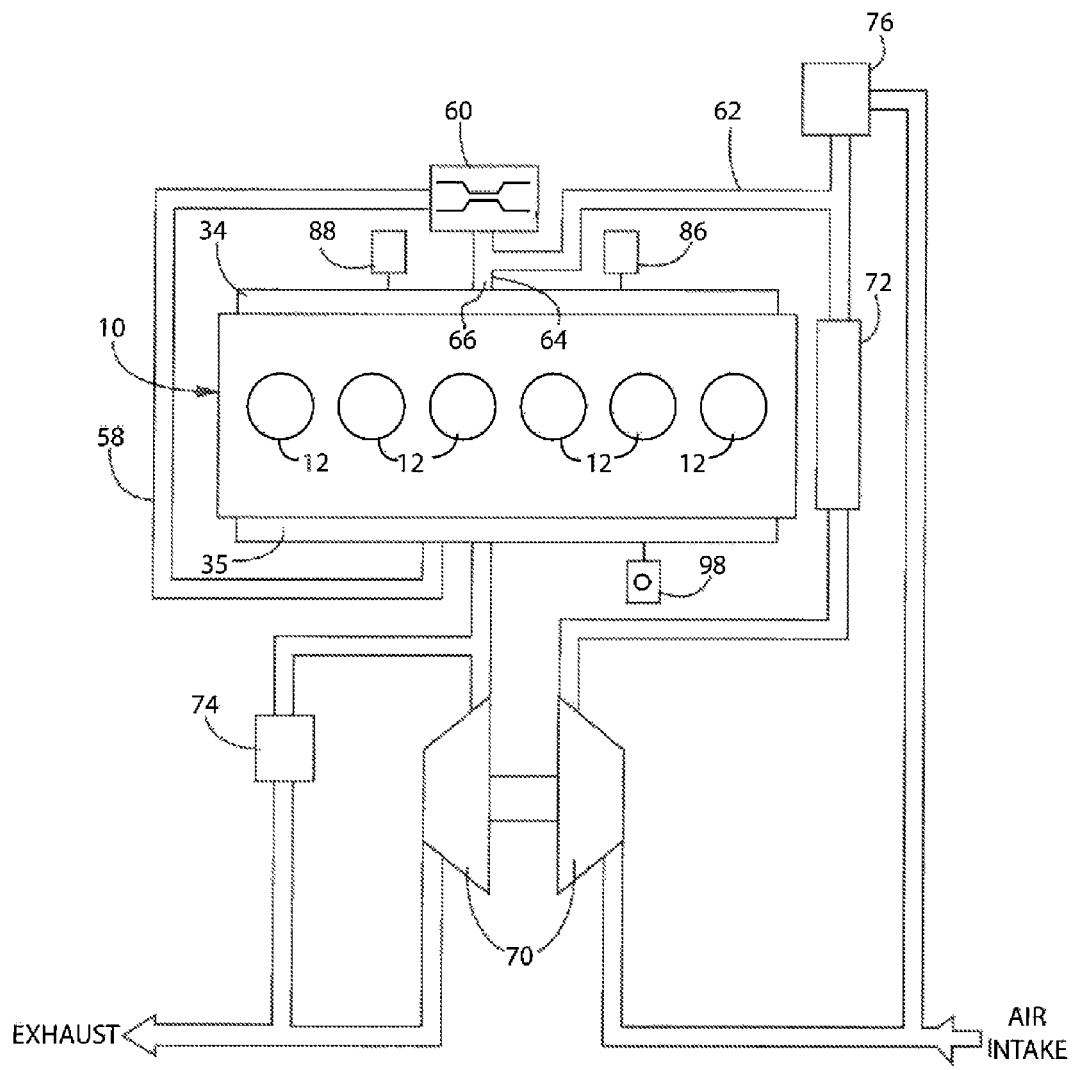
FIG. 2 is a schematic view of the engine of FIG. 1 and of the air supply system for the engine.
Figure 3:
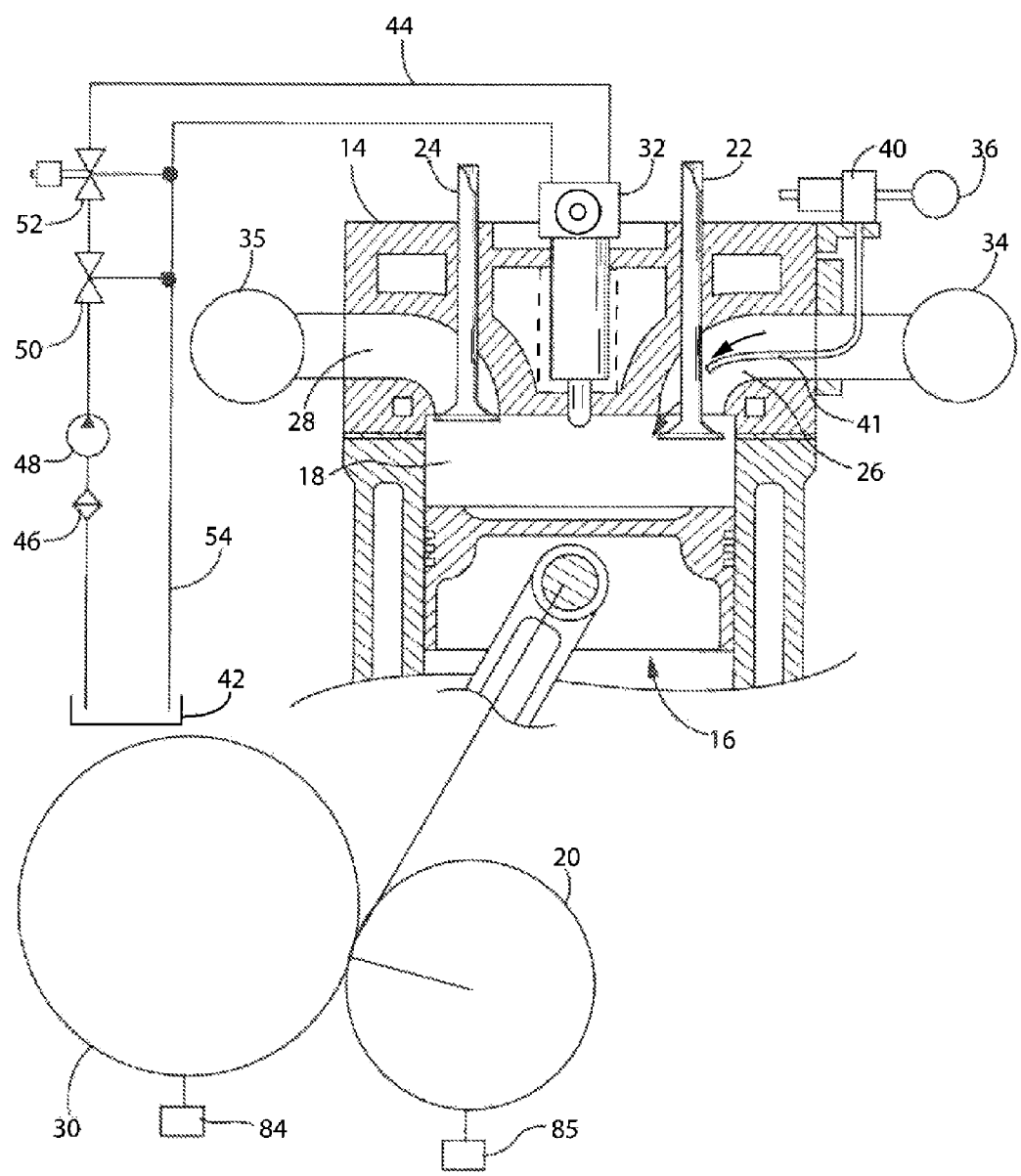
FIG. 3 is a partially schematic, sectional side elevation view of a cylinder of the engine of FIGS. 1 and 2 and of associated engine components.

Referring now to FIGS. 1-3, an engine 10 is illustrated that incorporates a control system constructed in accordance with a preferred embodiment of the invention. Before discussing the engine and the associated control system in detail, it must be emphasized that they are exemplary only and that the invention as claimed herein is usable with a wide variety of dual fuel engines incorporating a wide variety of gaseous fuel supply systems, liquid fuel supply systems, and air supply systems.

The exemplary engine 10 illustrated in FIGS. 1-3 is a compression ignition-type internal combustion engine having a plurality of cylinders 12, each capped with a cylinder head 14 (FIG. 3). As is also shown in FIG. 3, a piston 16 is slidably disposed in the bore of each cylinder 12 to define a combustion chamber 18 between the cylinder head 14 and the piston 16. Piston 16 is also connected to a crankshaft 20 in a conventional manner. Conventional inlet and exhaust valves 22 and 24 are provided at the end of respective passages 26 and 28 in the cylinder head 14 and are actuated by a standard camshaft 30 so as to control the supply of an air/fuel mixture to and the exhaust of combustion products from the combustion chamber 18. Gases are supplied to and exhausted from engine 10 via an intake air manifold 34 and an exhaust manifold 35, respectively. However, unlike in conventional engines, a throttle valve which would normally be present in the intake manifold 34 is absent or at least disabled, thereby producing an "unthrottled" engine. An intake air control system may also be provided.

The engine 10 typically will be fueled alternatively by pilot ignited gas ("gas mode") or by diesel fuel only (diesel mode). It will most typically be fueled by pilot ignited gas over part of the speed/load range of the engine 10 and by diesel only during the remainder of the speed/load range. Depending on factors such as the desired application and the capabilities of the various components, it could be fueled by pilot ignited gas over the full speed/load range of the engine. The present invention is applicable to all compression ignited natural gas engines.

Gaseous fuel could be supplied via a single metering valve discharging into a single throttle body at the entrance of the manifold 34, via a similarly-situated mechanically controlled valve, or even via a plurality of high pressure direct injector, each of which injects fuel directly into one of the combustion chambers 18. In the illustrated embodiment, however, a separate external injector 40 is provided for each cylinder 12. Each injector 40 receives natural gas, propane, or another gaseous fuel from a common tank 39 and a manifold 36 and injects fuel directly into the inlet port 26 of the associated cylinder 12 via a line 41. Gas flow to the injectors 40 can be disabled by closing a shutoff valve 43 located in the line leading to the manifold 36.

The illustrated engine 10 employs multiple electronically controlled liquid fuel injectors 32 as pilot fuel injectors. Each pilot fuel injector 32 could comprise any electronically controlled fuel injector. Referring to FIGS. 1 and 3, each injector 32 of this embodiment is a so-called "common rail" injectors fed with diesel fuel or the like from a conventional tank 42 via a supply line or common rail 44. Disposed in line 44 are a filter 46, a pump 48, a high pressure relief valve 50, and a pressure regulator 52. A return line 54 also leads from the injector 32 to the tank 42.

Referring to FIG. 2, the air intake control system may include (1) an exhaust gas recirculation (EGR) subsystem permitting recirculated exhaust gases to flow from an exhaust manifold 35 to the intake manifold 34 and/or (2) a turbocharging subsystem which charges non-EGR air admitted to the intake manifold 34. The EGR subsystem is useful for increasing combustion reactivity and extending the upper limit for optimum air fuel ratio (lambda). The EGR subsystem has an EGR metering valve 60 located in a return line 58 from the exhaust manifold 35 to the intake manifold 34. Valve 60 has an outlet connected to an intake line 64 leading to an intake port 66 of the intake manifold 34. A second line 62 leads from a turbo bypass valve 76 to the line 64 downstream from valve 60.

As is further shown in FIG. 2, the turbocharging subsystem of the intake air control system includes a turbocharger 70 and an aftercooler 72 provided in line 62 upstream of the valve 60 and intake port 66. Operation of the turbocharger 70 is controlled in a conventional manner by a turbo wastegate control valve 74 and/or a turbo air bypass valve 76.

Figure 4:
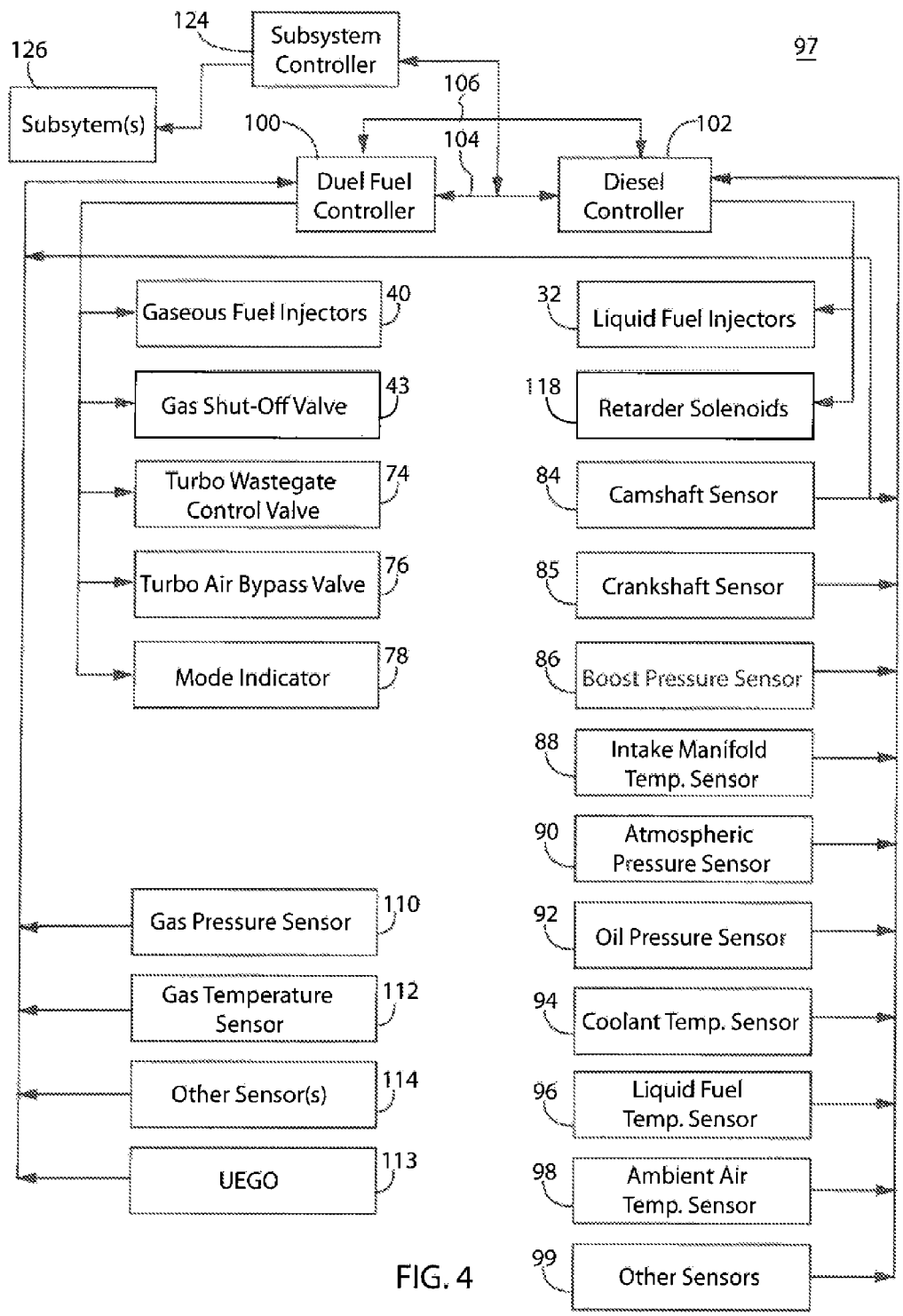
FIG. 4 is a schematic control diagram of the engine of FIGS. 1 and 2.

Referring now to FIG. 4, all of the controlled components of the engine are controlled via a control system that includes multiple dedicated controllers 100 and 102 connected to one another via a communications link 104 as disclosed, for example, in U.S. Pat. No. 6,694,242. (The term "dedicated controller," as used herein, means that the controller controls only the engine 10, not other engines slaved to or otherwise operably connected to the engine.) In the illustrated embodiment, the controller 100 is a dual fuel controller and the controller 102 is a diesel controller. The dual fuel controller 100 is configured, based on information received directly from sensors and from information received from the diesel controller 102 via the link 104, to control operation of the gaseous fuel supply system. The diesel controller 102 is configured, based on information received directly from sensors and from information received from the dual fuel controller 100 via the link 104, to control operation of the liquid fuel supply system. The controllers 102 and 104 are also preferably programmed so that the engine 10 can be operated in both a dual fuel mode and a diesel only mode. In this case, dual fuel controller 100 is configured to control the diesel controller 102 in a master-slave relationship when the engine is operating in the dual fuel mode, and the diesel controller 102 is configured to control all aspects of engine operation when the engine 10 is operating in the diesel only mode. Both controllers 100 and 102 may comprise any of a variety of commercially available programmable systems, preferably a programmable electronic control unit (ECU). A programmable ECU that is well-suited for use as the dual fuel controller 100 is available from Clean Air Power, Inc. of San Diego, Calif. under the designation Hawk. A number of programmable ECUs are well-suited for use as the diesel controller 102 and are available from original equipment manufacturers of diesel engines, including Robert Bosch GmbH, Volvo, and Caterpillar, Inc.

The communication link 104 preferably comprise a broadband controller link such as a CAN link permitting broadband two-way communication between the controllers 100 and 102. The controllers 100 and 102 may also additionally connected to one another by a traditional hardwire link 106. Link 106 provides limited back-up communications capability in the event of communication network overload. Specifically, when the engine 10 is operating in dual fuel mode, the commanded liquid fuel quantity is transmitted to the diesel controller 102 from the dual fuel controller 100 by both the link 104 and by the hardwire link 106. This redundant transmission assures timely receipt of the fuel command signal by the controller if the CAN link is temporarily busy transmitting other information.

Still referring to FIG. 4, the gaseous fuel supply system components are coupled to the dual fuel controller 100, and the liquid fuel supply system components are coupled to the diesel controller 102. Information required by both controllers 100 and 102 may be obtained in each case by a single sensor and transmitted to only one of the controllers. The information may then be relayed to the other controller via the link 104, thereby negating the need to incorporate redundant sensors into the control system. Examples of information obtained via a single source and shown in this manner is information indicative of intake manifold air temperature, intake manifold air pressure, pedal position, and engine speed.

In the illustrated embodiment, the dual fuel controller 100 receives signals from a gas pressure sensor 110, a gas temperature sensor 112, a universal exhaust gas oxygen sensor or "UEGO" sensor 113 and possibly other sensors collectively denoted 114. The diesel controller 102 receives engine timing/speed signals from a camshaft speed/timing sensor 84, which is also preferably connected directly to the dual fuel controller 100, and from a crankshaft speed/timing sensor 85. The diesel controller 102 also receives signals from a boost pressure sensor 86, an intake manifold air temperature sensor 88, an atmospheric air pressure sensor 90, an oil pressure sensor 92, a coolant temperature sensor 94, a diesel fuel temperature sensor 96, an ambient air temperature sensor 98, and possibly other sensors, collectively denoted 99. One or both of the controllers 100, 102 also may ascertain exhaust gas absolute pressure (EGAP), either directly from an EGAP sensor or indirectly from an exhaust back pressure (EBP) sensor (neither of which is shown). Other values, such as indicated mean effective pressure (IMEP) and the volume and quantity of gas ($Q_{gas}$ and $V_{gas}$, respectively) injected may be calculated by the controller(s) 100 and/or 102 using data from one or more of the sensors 80-99 and known mathematical relationships. Still other values, such as maximum intake manifold absolute pressure ($MAP_{max}$), maximum indicated mean effective pressure ($IMEP_{max}$), maximum engine speed ($RPM_{max}$), volumetric efficiency ($T_{vol}$), and various system constants are preferably stored in a ROM or other storage device of one or both of the controllers 100 and 102.

Based on these received and calculated values, the dual fuel controller 100 transmits signals to the gas injectors 40, the gas shut-off valve 43, the turbo wastegate control valve 74, the TAB valve 76, and an indicator 78. (The indicator 78 provides a visual indication of the current operational state of the engine 10, i.e., dual fuel mode or diesel only mode). Similarly, the diesel controller 102 is operable, based on information obtained directly from the sensors 84-86, etc. and information received from the dual fuel controller 100 via the CAN 104, to control operation of the diesel injectors 32 and possibly other equipment such as retarder solenoids 118.

Link 104 can also accommodate one or more sub-system controllers, such as the illustrated controller 124 in FIG. 4. The controller 124 controls one or more subsystems such as the subsystem 126 in FIG. 4 using information obtained from the sensors and/or the controllers 100 and 102 and transmitted over link 104. The controlled subsystem 126 may, for example, be an EGR subsystem, a water injection subsystem and/or another aftertreatment and/or pretreatment subsystem.

In use, during operation of the system in gas mode, the dual fuel controller 100 controls operation of the gas injectors 40, gas shut off valve 43, turbo wastegate control valve 74, TAB valve 76, gas injectors 40, and possibly other system components. The components preferably are manipulated to control lambda to optimize one or more desired engine operational characteristics as described in further detail below with reference to FIG. 5. The components preferably are also manipulated to control the timing and/or quantity of gaseous fuel injection and/or other characteristics of the gaseous fuel charge. The optimized characteristic(s) may, for example, be performance and/or one or more emissions. The dual fuel controller 100 also transmits a command signal to the diesel controller 102 via the CAN 104 to inject liquid fuel at a timing and quantity determined by the dual fuel controller 100. Hence, the diesel controller 102 may be controlled in a master-slave relationship, but acts as a conduit for some information required by the dual fuel controller 100 to control engine operation. Conversely, when the engine 10 is operating in a diesel-only mode, the gas shut-off valve 43 is closed, and the engine is controlled exclusively by the diesel controller 102. Selection between these two modes may occur manually via a suitable switch, but preferably occurs automatically based on a determined ability of the engine 10 to effectively operate in gas mode under prevailing engine operational characteristics. This determination preferably is made by the dual fuel controller 100 based on signals received directly from the sensors and/or indirectly from the diesel controller 102 via the link 104. Preferably, in the absence of a system fault, the engine 10 runs in diesel only mode only during engine start and warm-up, and otherwise runs in dual fuel mode.

Figure 5:
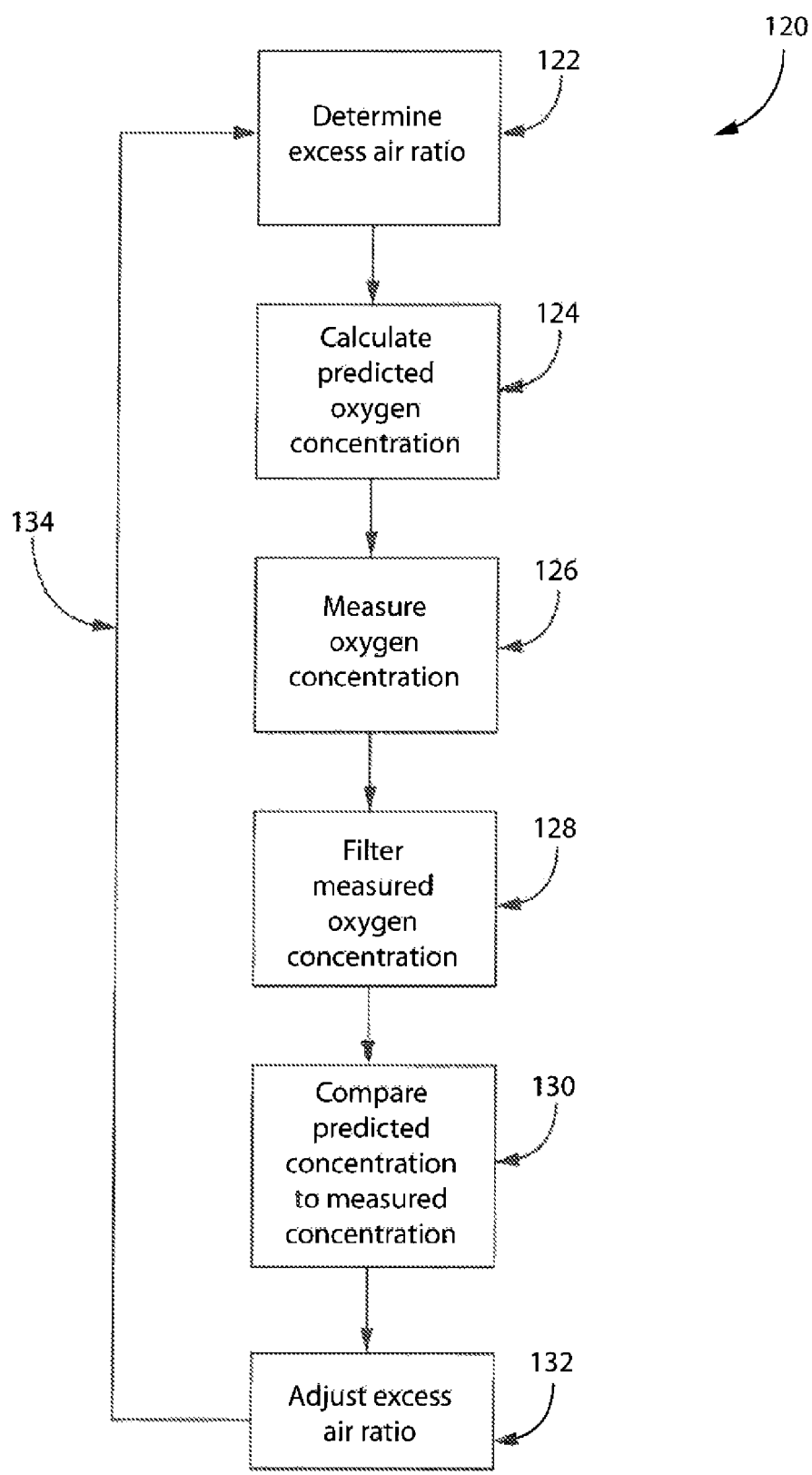
FIG. 5 is a flowchart illustrating a preferred computer-implemented technique for implementing the feedback linearization for lambda control for the engine of FIGS. 1 and 2.

Turning now to FIG. 5, a flowchart of a routine 120 that can be implemented by the controller 100 to correct gas lambda determination is illustrated. Specifically, routine 120 may be implemented to provide modified open loop lambda control based on desired EGO concentrations.

The routine 120 initially calculates or predicts gas lambda as pre-calibrated for current engine operating conditions in a block 122. The operating conditions may include, for example, current speed, current load, demanded fuel quality, MAP, etc. The predicted lambda may be determined by applying sensed prevailing engine operating conditions to a look up table of calculated lambdas that are associated with those operating conditions and that were obtained using empirical data obtained during system development.

In block 124, the routine 120 then determines a predicted EGO concentration as a function of the calculated or predicted gas lambda. The predicted EGO calculation is greatly affected by tolerances stacked up from factors such as fuel delivery calibrations, speed density maps, and natural gas composition. These tolerances may be improved by the use of UEGO sensor feedback as will now be described. Assuming 100% combustion efficiency of a gas fueled engine, i.e., assuming complete combustion of the fuel mixture, the predicted EGO concentration in terms of predicted oxygen mole fraction in exhaust gas can be derived from the equation:

$$O_2 = \frac{(\lambda-1)\left(1+\frac{x}{4}\right)}{\lambda(4.76+1.19x)+\frac{x}{4}-1+\frac{1}{n}\left[1+(4.76a+1.44b)\left(\frac{1}{y}-1\right)\right]} \quad \text{(Equation 1)}$$

Where:

$\lambda$ is the predicted gas lambda, $CH_x$ is the natural gas chemical formula, with x normally ranges from 3.8 to 4.0, $C_aH_b$ is the liquid fuel chemical formula. For diesel fuel, a=10.8 and b=18.7, y is the mole fraction of natural gas in the diesel and natural gas mixture, and n is the mole fraction of hydrocarbons ($CH_x$) in the natural gas composition that may include inert gases such as nitrogen and normally ranges from 0.96 and 1.0.

The mole fraction of natural gas in the diesel and natural gas mixture will depend on the fuel quantity delivered to the combustion chamber 18.

Figure 6:
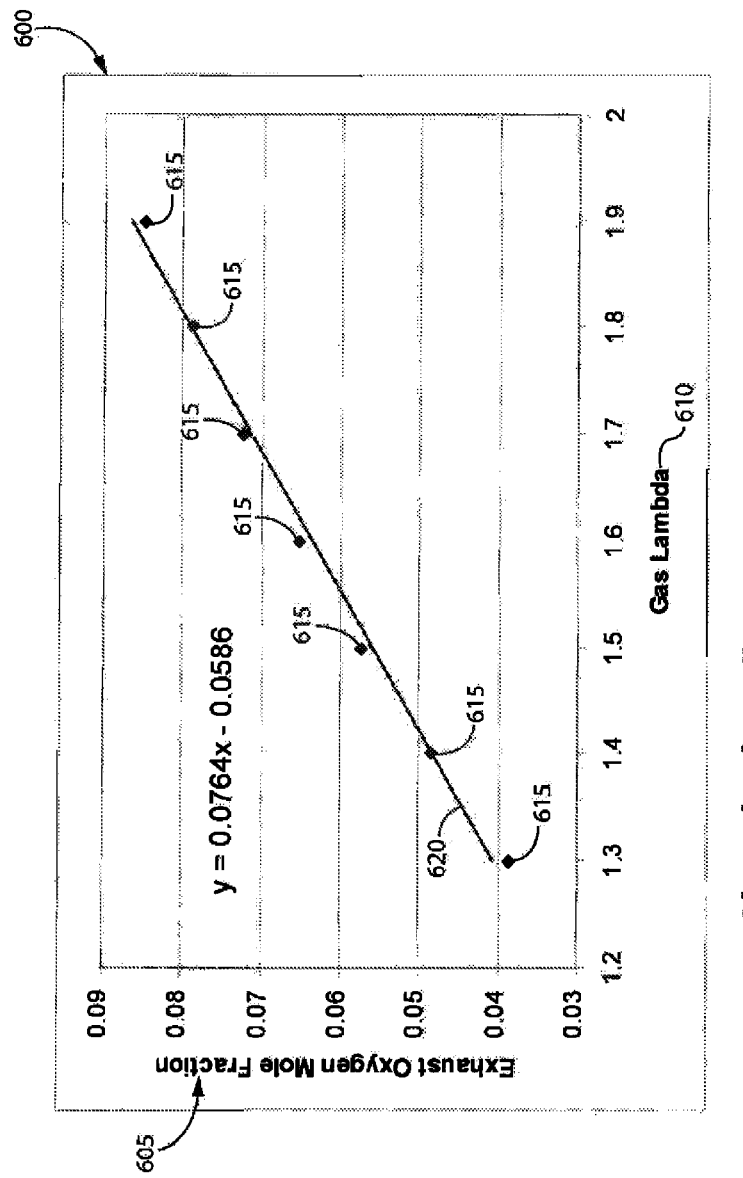
FIG. 6 is a graph illustrating a linearized predicted oxygen mole fraction.

Referring now to FIG. 6 a graph 600 illustrates the predicted oxygen mole fractions 605 in exhaust for a plurality of predicted gas lambda values 610 between the lean and rich limits, and individual predicted oxygen mole fraction in exhaust 615 for each specific predicted gas lambda, using these normal and predicted values, where x=3.9, a=10.8, b=18.7, n=0.98 and y=0.974.

The predicted oxygen concentration in exhaust can therefore be reasonably linearized by the straight line 620, and a linear equation.

Equation 2 is the linear equation calculating the predicted oxygen mole fraction in exhaust when gas lambda is operated between the lean and rich limits, 1.3 and 1.9, respectively.

$$O_2 = 0.0764\lambda - 0.0586 \quad \text{(Equation 2)}$$

Turning again to the routine 120 of FIG. 5, the measured $O_2$ is then determined in block 126 using the UEGO sensor 113 of FIG. 4. The controller 100 then obtains a filtered measured EGO concentration value in block 128, using a variable or fixed time based filtering factor. The filtering factor preferably is determined by accumulating the measured exhaust gas concentration over time to compensate for the time lag between the prediction of lambda at the generation of the fueling command signal and the subsequent receipt of the EGO concentration signal after the fuel is delivered, combusted, and exhausted. Predicted EGO concentration values also preferably are filtered, using the same or a different factor used to filter the measured values.

Figure 8:
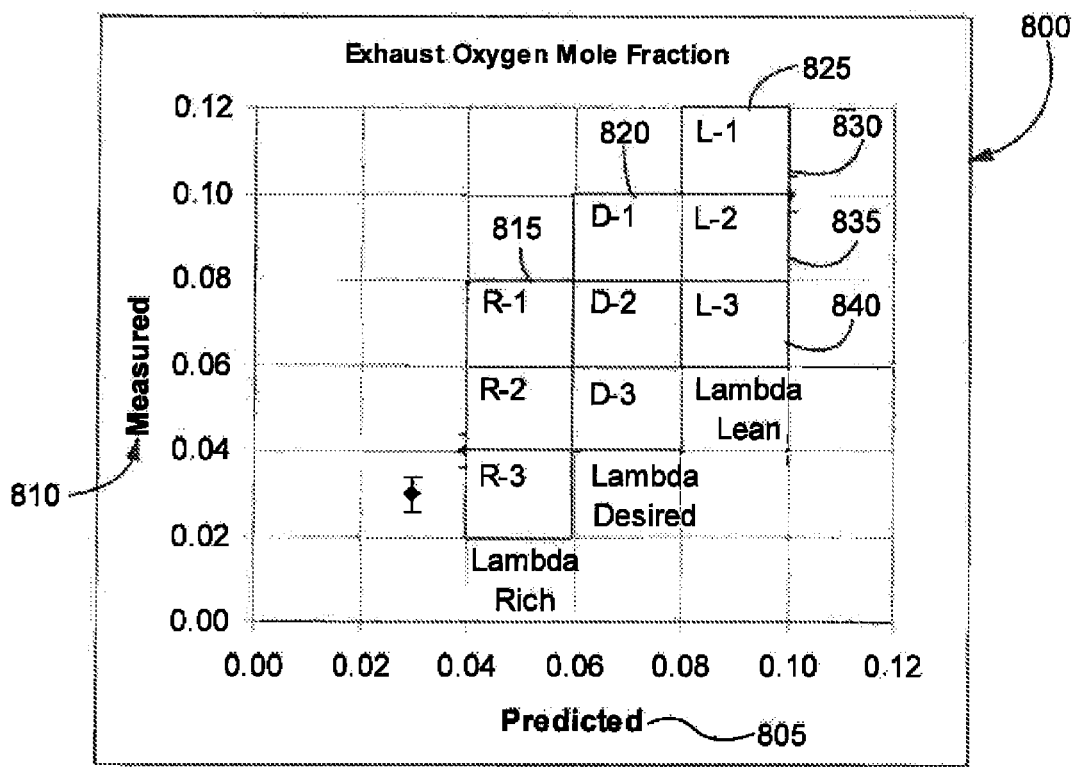
FIG. 8 is a graph illustrating defined regions of interest for the exhaust oxygen mole fraction.

In an especially preferred embodiment, time based filtering of both the measured and predicted EGO concentration values categorizes the correlation between predicted and measured EGO concentrations into regions or groups of interest that, in turn, can be divided into several zones as shown in FIG. 8. FIG. 8 depicts a graph 800 illustrating defined regions of interest for the exhaust oxygen mole fraction for the predicted $O_2$ value 805 compared to the measured $O_2$ value 810 as described in block 130 of routine 120, shown in FIG. 5. Three regions of interest may be defined to include a Lambda_Desired_Region 820, Lambda_Rich_Region 815 and Lambda_Lean_Region 825. Each region may further be divided into a plurality of zones.

For instance, in the case of the Lambda-Lean_Region 825, the region 825 is divided into an upper zone 830 including fractions above the defined tolerance range, a middle zone 835 including fractions within the defined tolerance range, and a lower zone 840 including fractions below the defined tolerance range. Each measured EGO concentration value is correlated with the corresponding predicted EGO concentration value and associated with the appropriate zone/region. The time based filtering factor is applied to all measured and predicted EGO concentration data associated with a given zone. According to a preferred embodiment, the time filtered measured and predicted EGO concentration values for each zone may be determined and stored as a moving average of the measured EGO concentration (Avg_Measured_O2) and a moving average of the predicted EGO concentration (Avg_Predicted_O2) in that zone.

The system continues to filter data until a statistically significant data sample is accumulated. For example, the filtering process may occur for a predetermined period of time such as a total operating time of an engine between switch on and switch off or a threshold number of engine revolutions, whichever is higher. Alternatively, it may occur until the data count in any one of the zones reaches a predefined threshold of, e.g., 500. The system then evaluates the collected and filtered data to determine whether lambda values need to be updated or corrected. In the presently disclosed embodiment, the Avg_Measured_O2 and Avg_Predicted_O2 values in the zone from each group that has the highest data count of the zones within that group are selected for potential evaluation, and the data for the remaining two zones in each group are discarded because they are considered to be statistically less significant. However, in an especially preferred embodiment, even the zone with the highest data count will not be evaluated unless the data count within that zone is significantly higher than the data count in the other two zones. For example, if the data count of the upper zone 830 of the Lambda_Lean region is less than 60% of the total data count of all three zones 830, 835 and 840, no values will be updated the Lambda_Lean region. However, the values will be evaluated in Lambda_Rich_Limit and the Lambda_Desired if the highest data count within one of the zones of each region is above 60% of the total data count.

Figure 7:
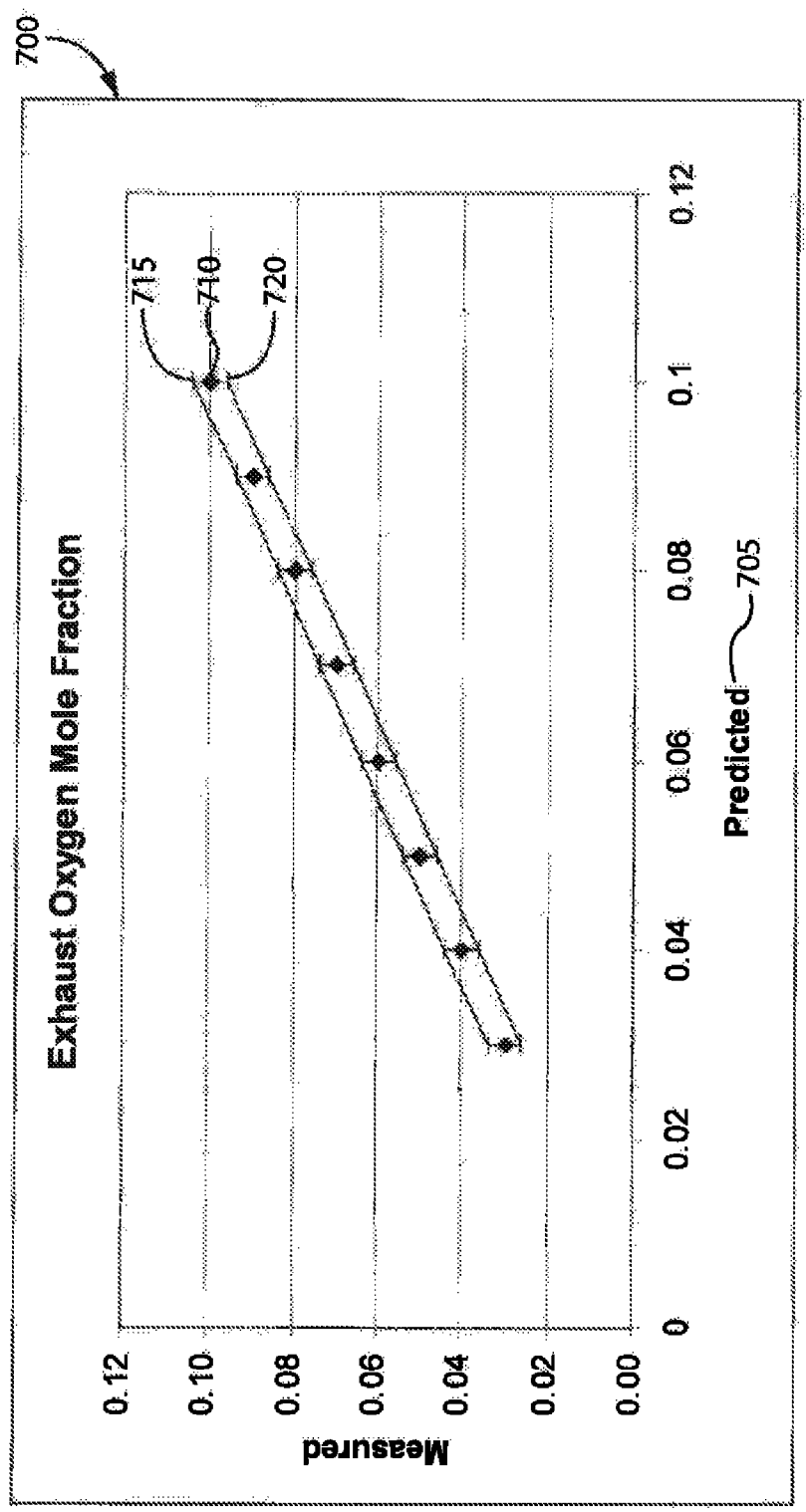
FIG. 7 is a graph illustrating allowable exhaust oxygen mole fraction errors.

Under ideal circumstances, the filtered measured EGO concentration value will match the filtered predicted EGO concentration value within an allowable error range, and no correction would be necessary. FIG. 7 depicts a graph 700 illustrating allowable exhaust oxygen mole fraction error ranges. Graph 700 illustrates that, for any given predicted $O_2$ value 705, a tolerance range 710 of, e.g., 0.010, may be defined within an upper measured $O_2$ limit 715 and a lower measured $O_2$ limit 720.

If, on the other hand, the deviation between the filtered measured and predicted EGO concentration values for the selected zone is above a designated threshold, at least one engine parameter has deviated from the calibrated value and has adversely impacted the calculation of lambda and the resultant predicted EGO concentration. In this eventuality, the routine 120 proceeds to block 132 and corrects predicted and determined gas lambda values for prevailing engine operation in the region containing that zone.

A preferred example of the evaluation process will now be provided to facilitate understanding of this embodiment of the invention.

Assume that, upon termination of the filtering phase of operation, the routine 120 has accumulated the following data.

TABLE 1

FILTERED DATA

| Region/Zone | Data Count | Filtered O$_2$ Predicted | Filtered O$_2$ Measured |
|---|---|---|---|
| Lambda Rich Region Upper Zone | 350 | 0.050 | 0.07 |
| Lambda Rich Region Middle Zone | 75 | 0.055 | 0.055 |
| Lambda Rich Region Lower Zone | 20 | 0.045 | 0.035 |
| Lambda Desired Region Upper Zone | 450 | 0.07 | 0.086 |
| Lambda Desired Region Middle Zone | 80 | 0.068 | 0.065 |
| Lambda Desired Region Lower Zone | 25 | 0.072 | 0.055 |
| Lambda Lean Region Upper Zone | 500 | 0.090 | 0.106 |
| Lambda Lean Region Middle Zone | 250 | 0.096 | 0.095 |
| Lambda Lean Region Lower Zone | 90 | 0.088 | 0.075 |

In this example, evaluation is triggered by the data count in the upper zone of the Lambda Lean region reaching 500. At this time, the upper zone of Lambda Rich region, the upper zone of Lambda Desired region, and the upper zone of Lambda Lean region are all selected for evaluation because each of these three zones has more than a 60% occupancy of the data points in the corresponding region. Since the deviation between measured and predicted EGO concentrations in the evaluated zone of each of these three regions exceeds the 0.005 O$_2$ mole fraction limit, Lambda values for all three regions need to be corrected.

The measured and predicted lambdas in each region are then updated or corrected using the data shown in Table 1 as indicated below:

Lambda Rich Region:

$$\lambda_{Rich\_Measured} = 13.09 \times 0.07 + 0.767 = 1.68$$

$$\lambda_{Rich\_Predicted} = 13.09 \times 0.05 + 0.767 = 1.42$$

Lambda Desired Region:

$$\lambda_{Desired\_Measured} = 13.09 \times 0.086 + 0.767 = 1.89$$

$$\lambda_{Desired\_Predicted} = 13.09 \times 0.07 + 0.767 = 1.68$$

Lambda Lean Region:

$$\lambda_{Lean\_Measured} = 13.09 \times 0.106 + 0.767 = 2.15$$

$$\lambda_{Lean\_Predicted} = 13.09 \times 0.09 + 0.767 = 1.95$$

The Lambda_Desired, Lambda_Rich_Limit and Lambda_Lean_Limit will then be updated or corrected as follows using the measured and predicted lambdas:

$$\lambda_{Rich\_Limit\_New} = 1.3 \times \left(1 + \frac{1.68 - 1.42}{1.42}\right) = 1.54,$$

where 1.3 is the Lambda_Rich_Limit used during the sampling period.

$$\lambda_{Desired\_New} = 1.75 \times \left(1 + \frac{1.89 - 1.68}{1.68}\right) = 1.97,$$

where 1.75 is the Lambda_Desired used during the sampling period.

$$\lambda_{Lean\_Limit\_New} = 1.9 \times \left(1 + \frac{2.15 - 1.95}{1.95}\right) = 2.09,$$

where 1.9 is the Lambda_Lean_Limit used during the sampling period.

Following block 132, all average values and data counts for each zone may then be reset, and routine 120 can be reinitiated in a step 134.

To the extent that they might not be apparent from the above, the scope of variations falling within the scope of the present invention will become apparent from the appended claims.

We claim:

1. A computer-implemented method for correcting a deviation between a predicted gas excess air ratio and an actual gas excess air ratio in a compression ignited gaseous fueled engine, comprising:
    (A) using at least one programmed computer, predicting a gas excess air ratio fix the engine based on at least one detected current engine operating parameter;
    (B) using the at least one programmed computer, calculating a predicted exhaust gas oxygen concentration value based at least in part on the predicted gas excess air ratio;
    (C) using the at least one programmed computer, measuring an exhaust gas oxygen concentration using an oxygen sensor coupled to the compression ignited gaseous fueled engine;
    (D) using at least one time-based factor, filtering, via the at least one programmed computer, a plurality of the measured exhaust oxygen concentration measurements and a plurality of the predicted exhaust oxygen concentrations to obtain a filtered measured exhaust gas concentration value and a filtered predicted exhaust oxygen concentration value;
    (E) using the at least one programmed computer, comparing the filtered measured exhaust oxygen concentration value to the filtered predicted exhaust gas oxygen concentration value to determine an exhaust gas oxygen concentration deviation value; and
    (F) using the at least one programmed computer, calculating a corrected gas excess air ratio if the deviation exceeds a designated threshold.

2. The computer-implemented method of claim 1, wherein the time-based factor is a variable value that compensates for a time lag between the time that a demand is made to supply fuel to the engine and the time that the corresponding exhaust gases are exhausted from the engine.

3. The computer-implemented method of claim 1, wherein the acts of filtering and comparing include, using the at least one programmed computer, performing the steps of:
    defining a plurality of zones, each zone correlating to a range of predicted and measured exhaust gas oxygen concentration values;
    associating each measured exhaust gas oxygen concentration value with one of the zones and calculating a moving average of the measured exhaust gas oxygen concentration values to obtain the filtered measured exhaust gas oxygen concentration value associated with the one zone;
    determining a deviation between the filtered measured exhaust gas oxygen concentration value associated with the one zone and the filtered predicted exhaust gas concentration value associated with the one zone;

determining whether the deviation exceeds the predefined threshold.

4. The computer-implemented method of claim 3, wherein the zones are grouped into regions, including at least one of a lambda rich region, a lambda desired region, and a lambda lean region.

5. The computer-implemented method of claim 4, wherein the act of calculating the corrected gas excess air ratio includes, using the at least one programmed computer, calculating at least one of a lean corrected gas excess air ratio, a desired corrected gas excess air ratio, and a rich corrected gas excess air ratio.

6. The computer-implemented method of claim 5, wherein the act of calculating the corrected gas excess air ratio includes, using the at least one programmed computer, calculating at least one of a lean corrected gas excess air ratio limit and a rich corrected gas excess air ratio limit.

7. The computer-implemented method of claim 1, wherein the act of calculating the corrected gas excess air ratio comprises, using the at least one programmed computer, calculating both a corrected predicted gas excess air ratio and a corrected measured gas excess air ratio.

8. A compression ignition internal combustion engine, comprising
 a plurality of cylinders;
 a gaseous fuel supply system associated with the cylinders;
 a liquid fuel supply system associated with the cylinders;
 an intake manifold cooperating with each of the cylinders;
 an exhaust manifold also cooperating with each of the cylinders;
 an exhaust gas oxygen sensor that cooperates with the exhaust manifold and that measures exhaust gas oxygen concentration in the exhaust generated by the cylinders; and
 a control system that
  controls operation of the gaseous fuel supply based at least in part on gas excess air fuel ratio;
  predicts a gas excess air ratio for the engine based at least in part on at least one detected current operating parameter;
  calculates a predicted exhaust gas oxygen concentration for exhaust gas generated by the engine based on the predicted gas excess air ratio;
  using at least one time-based factor, filters a plurality of the measured exhaust oxygen concentration measurements and a plurality of the predicted exhaust oxygen concentrations to obtain a filtered measured exhaust gas concentration value and a filtered predicted exhaust oxygen concentration value,
  compares the filtered exhaust gas oxygen concentration to the filtered predicted exhaust gas oxygen concentration value to determine an exhaust gas oxygen concentration deviation value, and, if the deviation value exceeds a designated threshold,
  calculates a corrected gas excess air ratio.

9. The engine of claim 8, wherein the time based filtering factor is a variable value, the variation compensating for a time lag between the time that a demand is made to supply fuel to the engine and the time that the corresponding exhaust gases are exhausted from the engine.

10. The engine of claim 8, wherein, in preparation for the comparing operation, the controller:
 defines a plurality of zones, each zone correlating to a range of measured and predicted exhaust gas oxygen concentration values;
 associates each measured exhaust gas oxygen concentration with a zone and generates a moving average of the measured exhaust gas oxygen concentration values and the predicted exhaust gas oxygen concentration values, thereby calculating the filtered measured and predicted exhaust gas oxygen concentration values;
 detects when a number of measured exhaust gas oxygen concentration values associated with one of the zones exceeds a predefined threshold; and,
 selects the moving averages from the one zone for the comparison.

11. The engine of claim 10, wherein the zones are grouped in regions, including at least one of a lambda rich region, a lambda desired region, and a lambda lean region.

12. The engine of claim 11, wherein the controller calculates at least a corrected lean gas excess air ratio, a corrected desired gas excess air ratio, and a corrected rich gas excess air ratio.

13. A computer-implemented method, comprising:
 using at least one programmed computer, predicting an exhaust gas oxygen concentration for exhaust gas generated by a gaseous fueled compression ignition engine;
 using the at least one programmed computer, measuring an actual exhaust gas oxygen concentration for the engine;
 using the at least one programmed computer, using at least one time-based factor, filtering a plurality of the measured exhaust oxygen concentration measurements and a plurality of the predicted exhaust oxygen concentrations to obtain a filtered measured exhaust gas concentration value and a filtered predicted exhaust oxygen concentration value; and
 using the at least one programmed computer, calculating a corrected predicted gas excess air ratio and a corrected measured gas excess air ratio using the filtered predicted and measured exhaust gas oxygen concentration values.

14. The computer-implemented method of claim 13, wherein the time-based correction factor is a variable value, the variation compensating for a time lag between the time that a demand is made to supply fuel to the engine and the time that the corresponding exhaust gases are exhausted from the engine.

15. The computer-implemented method of claim 13, further comprising, using the at least one programmed computer, determining a deviation between the filtered measured exhaust gas oxygen concentration value and the filtered predicted exhaust gas oxygen concentration value and calculating the corrected predicted and measured gas excess air ratio values only if the deviation exceeds a designated threshold.

16. The computer-implemented method of claim 13, wherein the act of filtering includes, using the at least one programmed computer, performing the steps of:
 defining a plurality of zones, each zone correlating to a range of measured and predicted exhaust gas oxygen concentration values, the zones being grouped into a plurality of regions; and
 associating each measured exhaust gas oxygen concentration value with a zone and generating a moving average of each of 1) the measured exhaust gas oxygen concentration values and 2) the predicted exhaust gas oxygen concentrations values, whereby each zone has a data count of measured and predicted exhaust gas oxygen concentrations.

17. The computer-implemented method of claim 16, wherein the calculating step includes, for each of the regions, calculating, using the at least one programmed computer, a corrected predicted gas excess air ratio and a corrected measured gas excess air ratio using filtered predicted and measured exhaust gas oxygen concentration values associated with the zone in that region having the highest data count.

18. The computer-implemented method of claim 16, wherein the regions are grouped in at least one of a lambda rich region, a lambda desired region, and a lambda lean region.

19. The computer-implemented method of claim 16, further comprising, using the at least one programmed computer, calculating at least one of a lean corrected gas excess air ratio limit and a rich corrected gas excess air ratio limit.

* * * * *